(12) United States Patent
Matthews

(10) Patent No.: US 7,953,539 B2
(45) Date of Patent: May 31, 2011

(54) TORQUE SPLIT STRATEGY FOR A BELT ALTERNATOR STARTER (BAS) HYBRID

(75) Inventor: Gregory P. Matthews, West Bloomfield, MI (US)

(73) Assignee: GM Global Technology Operations LLC

(*) Notice: Subject to any disclaimer, the term of this patent is extended or adjusted under 35 U.S.C. 154(b) by 576 days.

(21) Appl. No.: 12/049,608

(22) Filed: Mar. 17, 2008

(65) Prior Publication Data

US 2008/0249695 A1 Oct. 9, 2008

Related U.S. Application Data

(60) Provisional application No. 60/921,799, filed on Apr. 4, 2007.

(51) Int. Cl.
*B60W 10/06* (2006.01)
*B60W 10/08* (2006.01)
*B60W 20/00* (2006.01)

(52) U.S. Cl. ...................................... 701/101

(58) Field of Classification Search .................. 123/701; 701/101
See application file for complete search history.

(56) References Cited

U.S. PATENT DOCUMENTS

| | | | |
|---|---|---|---|
| 7,154,236 B1 | 12/2006 | Heap | |
| 2002/0063540 A1* | 5/2002 | Oshima et al. | 318/139 |
| 2002/0107617 A1* | 8/2002 | Tomikawa | 701/22 |
| 2007/0012494 A1* | 1/2007 | Ibenthal et al. | 180/65.3 |
| 2008/0176705 A1* | 7/2008 | Tamai et al. | 701/51 |
| 2008/0217083 A1* | 9/2008 | Serkh et al. | 180/165 |
| 2008/0228351 A1* | 9/2008 | Mc Gee | 701/36 |
| 2008/0249695 A1* | 10/2008 | Matthews | 701/101 |

OTHER PUBLICATIONS

U.S. Appl. No. 11/858,366, filed Jan. 14, 2008, Douglas J. Babcock.
U.S. Appl. No. 61/025,512, filed Feb. 1, 2008, James R. Yurgil.

* cited by examiner

*Primary Examiner* — Stephen K Cronin
*Assistant Examiner* — Arnold Castro

(57) ABSTRACT

A torque control system may include a first module that determines an internal combustion engine (ICE) torque command and an electric machine (EM) torque command based on a propulsion torque request. The torque control system may also include a second module that delays the EM torque command based on a dynamic torque response of the ICE.

22 Claims, 8 Drawing Sheets

TORQUE SPLIT STRATEGY FOR A BELT ALTERNATOR STARTER (BAS) HYBRID

CROSS-REFERENCE TO RELATED APPLICATIONS

This application claims the benefit of U.S. Provisional Application No. 60/921,799, filed on Apr. 4, 2007. The disclosure of the above application is incorporated herein by reference in its entirety.

FIELD

The present disclosure relates to a hybrid powertrain of a vehicle, and more specifically to a torque split strategy for a hybrid powertrain.

BACKGROUND

The statements in this section merely provide background information related to the present disclosure and may not constitute prior art.

Hybrid powertrains typically include a first torque generator, such as an internal combustion engine (ICE), and a second torque generator, such as an electric machine (EM), each providing torque to a driveline to propel a vehicle. In a full hybrid powertrain, the EM drives the driveline directly without transferring torque through a component of the ICE. In a mild hybrid powertrain, the EM is typically coupled with the ICE through an accessory drive such that torque generated by the EM is transferred to the driveline through the ICE. An exemplary mild hybrid powertrain includes a belt alternator starter (BAS) system. In the BAS system, the EM is coupled to the ICE via a traditional belt and pulley configuration that drives vehicle accessories such as pumps and compressors.

Powertrain torque control typically includes axle torque and propulsion torque control domains. In the mild hybrid powertrain, the propulsion torque is the output torque at the crankshaft of the ICE. This output torque includes the EM torque contribution.

Powertrain torque control typically monitors and adjusts predicted torque and immediate torque. Predicted torque is a slow changing set point of the system. For example, a typical predicted torque request may include driver input. In a spark ignited system, the predicted torque value controls the airflow. In diesel or electric systems, the predicted torque value is shaped to establish a normal operating point of the system according to driver preference. Conversely, immediate torque is a fast changing set point of the powertrain system. Immediate torque is only active when a torque intervention is active. In a spark ignited system, the immediate torque value controls the spark and fuel. In a diesel or electric system, the immediate torque value controls the actual torque produced by the system.

Mild hybrid powertrain control typically provides an EM torque command while commanding the ICE torque actuators directly. Mild hybrid powertrain control typically does not dynamically compensate the EM torque command to account for a delay in the ICE torque response. Thus, a propulsion torque output may undershoot or overshoot the propulsion torque request.

SUMMARY

Accordingly, the present disclosure includes a torque control system that may split a propulsion torque command into an internal combustion engine (ICE) torque command and an electric machine (EM) torque command. The torque control system may include a first module that determines an ICE torque command and an EM torque command based on a propulsion torque request. The torque control system may also include a second module that delays the EM torque command based on a dynamic torque response of the ICE.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
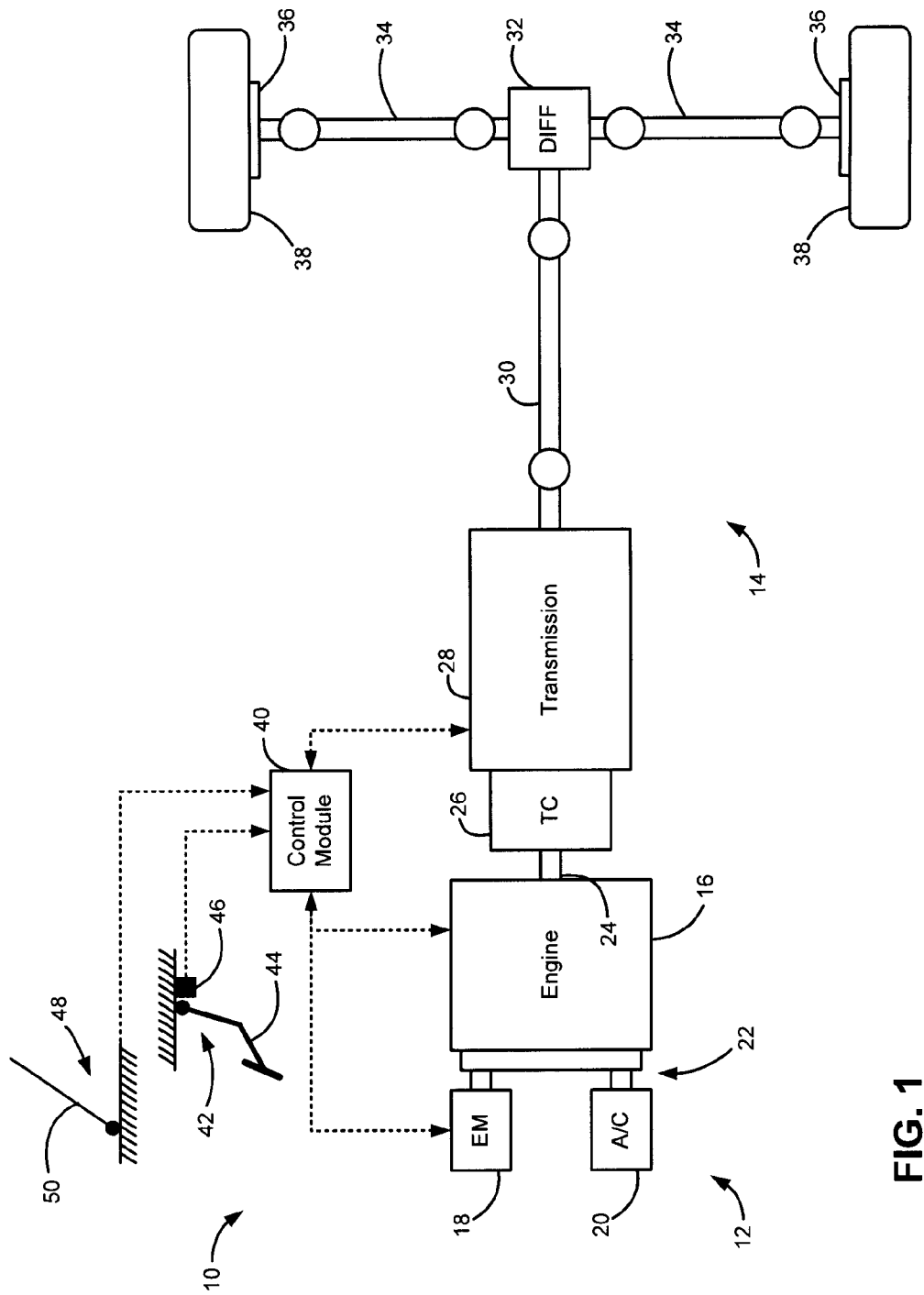
FIG. 1 is a functional block diagram of an exemplary hybrid powertrain system according to the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Inputs from a driver and/or a cruise control system (i.e., true torque requests) reflect an amount of torque desired. All other torque modifiers including, but not limited to, traction control, stability control, engine overspeed protection, transmission torque limiting and the like, are typically considered torque interventions. These torque interventions are in either an active or inactive state. When all of the torque interventions are either inactive or apply a limit that does not ultimately limit a torque request, the torque request will pass through unchanged. For purposes of clarity, the term torque request is used herein for both true torque requests and torque interventions.

Referring now to FIG. 1, an exemplary hybrid powertrain 10 is shown. Although the powertrain 10 is illustrated as a rear wheel drive (RWD) powertrain, it is appreciated that the torque control system of the present disclosure can be implemented with any other powertrain configuration. The powertrain 10 includes a propulsion system 12 and a driveline system 14. The propulsion system 12 includes an internal combustion engine (ICE) 16 and an electric machine (EM) 18. The propulsion system may also include one or more auxiliary components 20 including, but not limited to, an A/C compressor. The EM 18 and the auxiliary components 20 are drivingly coupled to the ICE 16 using a belt and pulley system 22. The belt and pulley system 22 includes a plurality of pulleys that are fixed for rotation with the EM 18, the auxiliary components 20, and the crankshaft 24 of the ICE 16, as well as a belt to enable torque to be transferred to/from the crankshaft 24 from/to the EM 18 and/or the auxiliary components 20. This configuration is referred to as a belt alternator starter (BAS) system.

The crankshaft 24 of the ICE 16 drives the driveline system 14. The driveline system 14 includes a flexplate or flywheel (not shown), a torque converter or other coupling device 26, a transmission 28, a propeller shaft 30, a differential 32, axle shafts 34, brakes 36 and driven wheels 38. A propulsion torque ($T_{PROP}$) that is output at the crankshaft 24 of the ICE 16 is transferred through the driveline system 14 to provide an axle torque ($T_{AXLE}$) at the axle shafts 34 to drive the wheels 38. More specifically, $T_{PROP}$ is multiplied by several gear ratios provided by the coupling device 26, the transmission 28 and the differential 32 to provide $T_{AXLE}$ at the axle shafts 34. $T_{PROP}$ is multiplied by an effective gear ratio, which is a function of the ratio introduced by the coupling device 26, the transmission gear ratio determined by transmission input/output shaft speeds, the differential ratio, as well as any other component that may introduce a ratio in the driveline system 14 (e.g., a transfer case in a four wheel drive (4WD) or all wheel drive (AWD) powertrain).

A control module 40 regulates operation of the powertrain 10 based on the torque control system of the present disclosure. A driver input 42 communicates with the control module 40. The driver input 42 can include, but is not limited to, an accelerator pedal 44 and/or a cruise control system 46. A driver interface 48 also communicates with the control module 40. The driver interface 48 includes, but is not limited to, a transmission range selector 50.

The control module 40 may rely on the EM 18 rather than the ICE 16 for torque contribution to improve fuel economy, or use the EM 18 in addition to the ICE 16 to provide an acceleration boost. In addition, the control module 40 may shut off the fuel supply to ICE 16 during a stopping event to improve fuel economy and use the EM 18 to restart the ICE 16 quickly. The control module 40 uses inputs from a propulsion torque arbitration ring (PTAR) and an opportunity charge discharge ring (OCDR) to determine an ICE torque command and an EM torque command ($T_{EM}$). The PTAR and the OCDR may reside in the control module 40 or in a separate module. Inputs from the PTAR include a predicted propulsion torque request ($T_{SLOW\_PROP}$), an immediate propulsion torque request ($T_{FAST\_PROP}$), a minimum engine off torque ($T_{MIN\_OFF}$), a vehicle coast torque ($T_{COAST}$), a minimum engine run torque ($T_{MIN\_RUN}$), and a maximum ICE torque ($T_{MAX\_ICE}$).

The PTAR may include coast regeneration logic that sets $T_{SLOW\_PROP}$ less than $T_{MIN\_RUN}$ and $T_{COAST}$ during a coasting event to capture energy input into the hybrid powertrain 10 through the wheels 38. The PTAR may also include brake regeneration logic that sets $T_{FAST\_PROP}$ less than $T_{MIN\_OFF}$ during a braking event to capture energy input into the hybrid powertrain 10 through the wheels 38. Inputs from the OCDR include a charge torque request ($T_{CHARGE}$) and a negative charge or discharge torque request ($T_{DISCHARGE}$). The ICE torque command includes an immediate ICE torque command ($T_{FAST\_ICE}$) and a predicted ICE torque command ($T_{SLOW\_ICE}$). $T_{EM}$ includes a predicted EM torque command ($T_{SLOW\_EM}$) unless $T_{FAST\_PROP}$ is active, in which case $T_{EM}$ includes an immediate EM torque command ($T_{FAST\_EM}$).

The control module 40 provides $T_{EM}$ to the EM 18 and $T_{FAST\_ICE}$ and $T_{SLOW\_ICE}$ to the ICE 16. $T_{EM}$ controls the torque output of the EM 18. When $T_{FAST\_PROP}$ is active, $T_{SLOW\_ICE}$ controls the airflow in the ICE 16 while $T_{FAST\_ICE}$ controls the spark and fuel in the ICE 16. When $T_{FAST\_PROP}$ is not active, $T_{SLOW\_ICE}$ controls the airflow, spark, and fuel in the ICE 16. The airflow, spark, and fuel in the ICE 16 govern the torque output of the ICE 16. Thus, the propulsion torque output is controlled by $T_{EM}$, $T_{FAST\_ICE}$, and $T_{SLOW\_ICE}$. The control module 40 coordinates the EM torque response and the ICE torque response so that as one is decreased, the other is increased at the proper rate to ensure the propulsion torque output does not undershoot or overshoot the propulsion torque request.

Figure 2:
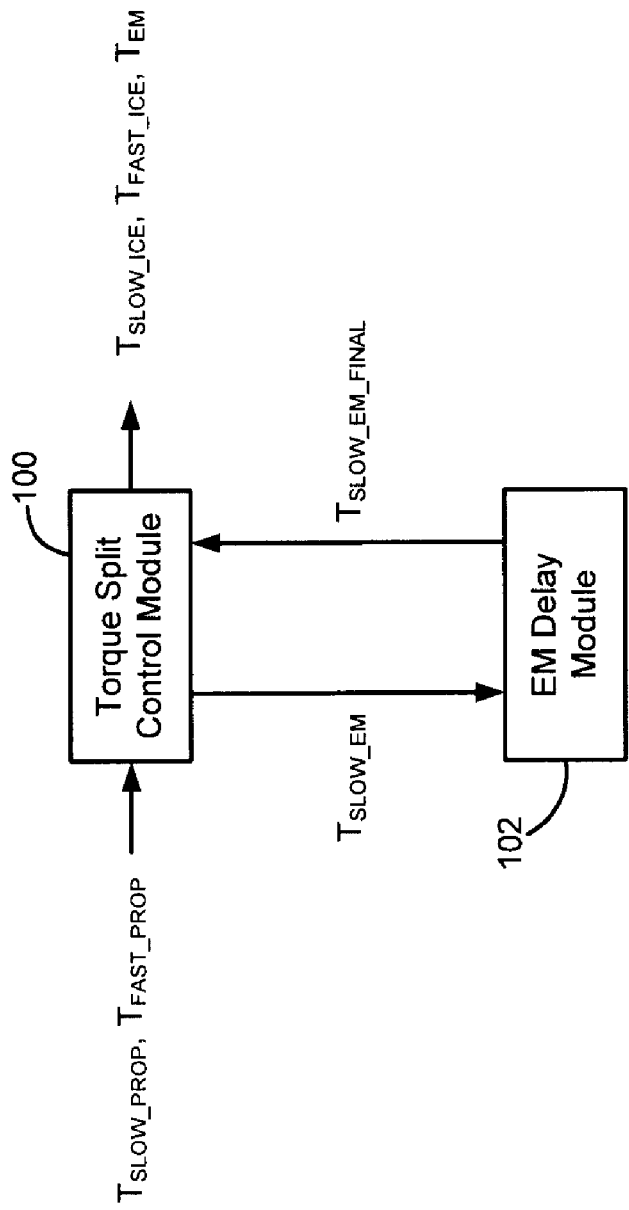
FIG. 2 is a functional block diagram illustrating exemplary modules that execute the torque control system according to the present disclosure.

Referring now to FIG. 2, a torque split control module 100 receives inputs from the PTAR and the OCDR, including $T_{SLOW\_PROP}$ and $T_{FAST\_PROP}$. The torque split control module 100 determines $T_{SLOW\_ICE}$ and $T_{SLOW\_EM}$ based on $T_{SLOW\_PROP}$. The torque split control module 100 provides $T_{SLOW\_EM}$ to an EM delay module 102. The EM delay module 102 calculates a final EM torque command ($T_{SLOW\_EM\_FINAL}$) based on $T_{SLOW\_EM}$ and a dynamic torque output response of the ICE 16. The EM delay module 102 provides $T_{SLOW\_EM\_FINAL}$ to the torque split control module 100. The torque split control module 100 determines $T_{EM}$ and $T_{FAST\_ICE}$ based on $T_{FAST\_PROP}$ when $T_{FAST\_PROP}$ is active. Otherwise, the torque split control module 100 determines $T_{EM}$ based on $T_{SLOW\_EM\_FINAL}$ and sets $T_{FAST\_ICE}$ to inactive. The torque split control module 100 outputs $T_{SLOW\_ICE}$, $T_{FAST\_ICE}$, and $T_{EM}$.

In other words, the torque split control module 100 splits propulsion torque requests into ICE and EM torque commands. The torque split control module 100 determines predicted ICE and EM torque commands based on the predicted propulsion torque request. The EM delay module 102 delays the predicted EM torque command to match the dynamic torque output response of the ICE 16. When the immediate propulsion torque request is active, the torque split control module 100 determines the EM torque command and the immediate ICE torque command based thereon. Otherwise, the torque split control module 100 determines the EM torque command based on the delayed or final predicted EM torque command and sets the immediate ICE torque command to inactive.

Figure 3:
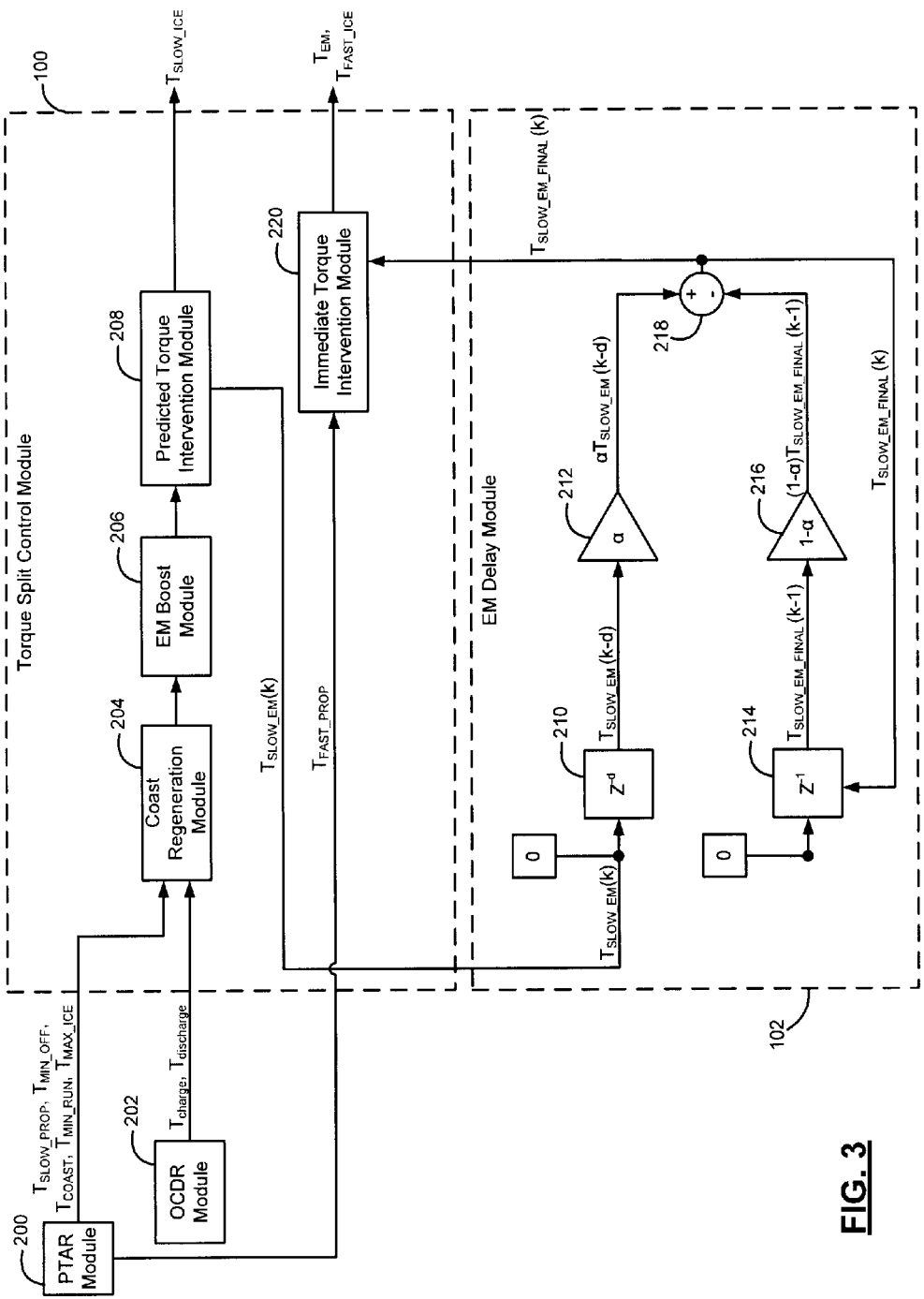
FIG. 3 is a functional block diagram illustrating a torque split control module and an EM delay module according to the present disclosure.

Referring now to FIG. 3, the torque split control module 100 receives inputs from the PTAR, including $T_{SLOW\_PROP}$, $T_{FAST\_PROP}$, $T_{MIN\_OFF}$, $T_{COAST}$, $T_{MIN\_RUN}$, and $T_{MAX\_ICE}$, and inputs from the OCDR, including $T_{CHARGE}$ and $T_{DISCHARGE}$. The torque split control module 100 includes a coast regeneration module 204, an EM boost module 206, and a predicted torque intervention module 208. When $T_{SLOW\_PROP}$ is less than $T_{MIN\_OFF}$ and the greater of $T_{MIN\_RUN}$ and $T_{COAST}$, the coast regeneration module 204 determines $T_{SLOW\_ICE}$ based on $T_{MIN\_OFF}$ or $T_{MIN\_RUN}$ and determines $T_{SLOW\_EM}$ based on $T_{SLOW\_ICE}$ and either $T_{SLOW\_PROP}$ or the EM torque capacity. When $T_{SLOW\_PROP}$ is not less than $T_{MIN\_OFF}$ and the greater of $T_{MIN\_RUN}$ and $T_{COAST}$, and $T_{SLOW\_PROP}$ is greater than $T_{MAX\_ICE}$, the EM boost module 206 determines $T_{SLOW\_ICE}$ based on $T_{MAX\_ICE}$ and determines $T_{SLOW\_EM}$ based on $T_{SLOW\_ICE}$ and either $T_{SLOW\_PROP}$ or the EM torque capacity. When $T_{SLOW\_PROP}$ is not less than $T_{MIN\_OFF}$ and the greater of $T_{MIN\_RUN}$ and $T_{COAST}$, and $T_{SLOW\_PROP}$ not greater than $T_{MAX\_ICE}$, the predicted torque intervention module 208 determines $T_{SLOW\_ICE}$ and $T_{SLOW\_EM}$ based on $T_{SLOW\_PROP}$ and either $T_{CHARGE}$ or an EM torque capacity. The predicted torque intervention module 208 provides $T_{SLOW\_EM}$ at a current iteration k ($T_{SLOW\_EM}(k)$) to the EM delay module 102.

The EM delay module 102 includes buffer modules 210, 214, gain modules 212, 216, and a summer 218. The buffer 210 outputs $T_{SLOW\_EM}$ at an iteration k-d ($T_{SLOW\_EM}(k-d)$) to the gain module 212. When $T_{SLOW\_EM}(k-d)$ does not exist, the buffer 210 sets $T_{SLOW\_EM}(k-d)$ equal to 0. The gain module 212 multiplies $T_{SLOW\_EM}(k-d)$ by a gain α and outputs the product (α $T_{SLOW\_EM}(k-d)$) to the summer 218. The buffer 214 outputs $T_{SLOW\_EM\_FINAL}$ at an iteration k-1 ($T_{SLOW\_EM\_FINAL}(k-1)$) to the gain module 216. When $T_{SLOW\_EM\_FINAL}(k-1)$ does not exist, the buffer 214 sets $T_{SLOW\_EM\_FINAL}(k-1)$ equal to 0. The gain module 216 multiplies $T_{SLOW\_EM}(k-d)$ by a gain 1-α and outputs the product ((1-α)$T_{SLOW\_EM}(k-1)$) to the summer 218. The summer 218 outputs $T_{SLOW\_EM\_FINAL}$ at an iteration k ($T_{SLOW\_EM\_FINAL}(k)$) to the buffer 214 and the torque split control module 100.

The torque split control module 100 also includes an immediate torque intervention module 220. When $T_{FAST\_PROP}$ is active, the immediate torque intervention module 220 determines $T_{EM}$ and $T_{FAST\_ICE}$ based on $T_{FAST\_PROP}$. Otherwise, the torque split control module 100 determines $T_{EM}$ based on $T_{SLOW\_EM\_FINAL}$ and sets $T_{FAST\_ICE}$ to inactive. The torque split control module 100 outputs $T_{SLOW\_ICE}$, $T_{FAST\_ICE}$, and $T_{EM}$.

In other words, torque split control module 100 determines whether the ICE 16 is being fueled, whether coast regeneration is requested, whether the maximum ICE torque capacity is exceeded, and whether the immediate propulsion torque request is active, and splits propulsion torque requests into ICE and EM torque commands accordingly. When the ICE 16 is not being fueled, the coast regeneration module 204 determines the predicted ICE torque command based on the minimum non-fueled ICE torque request and determines the predicted EM torque command based on the difference between the predicted propulsion torque request and the predicted ICE torque command. When the ICE 16 is being fueled and coast regeneration is requested, the coast regeneration module 204 determines the predicted ICE torque command based on the minimum fueled ICE torque request and determines the predicted EM torque command based on the difference between the predicted propulsion torque request and the predicted ICE torque command.

When the ICE 16 is being fueled and the predicted propulsion torque request exceeds the maximum ICE torque capacity, the EM boost module 206 determines the predicted ICE torque command based on the maximum ICE torque capacity, determines the predicted EM torque command based on the difference between the predicted propulsion torque request and the ICE torque command, and limits the predicted EM torque command within the EM torque capacity. When the ICE 16 is being fueled and the predicted propulsion torque request does not exceed the maximum ICE torque capacity, the predicted torque intervention module 208 determines the predicted EM torque command based on the predicted propulsion torque request, limits the predicted EM torque command within the EM torque capacity, and determines the predicted ICE torque command based on the difference between the predicted propulsion torque request and the predicted EM torque command.

When the immediate propulsion torque request is active, the immediate torque intervention module 220 determines the EM torque command based thereon, limits the EM torque command within the EM torque capacity, and determines the immediate ICE torque command based on the difference between the immediate propulsion torque request and the EM torque command. Otherwise, the immediate torque intervention module 220 determines the EM torque command based on the predicted EM torque command and sets the immediate ICE torque command to inactive.

Figure 4:
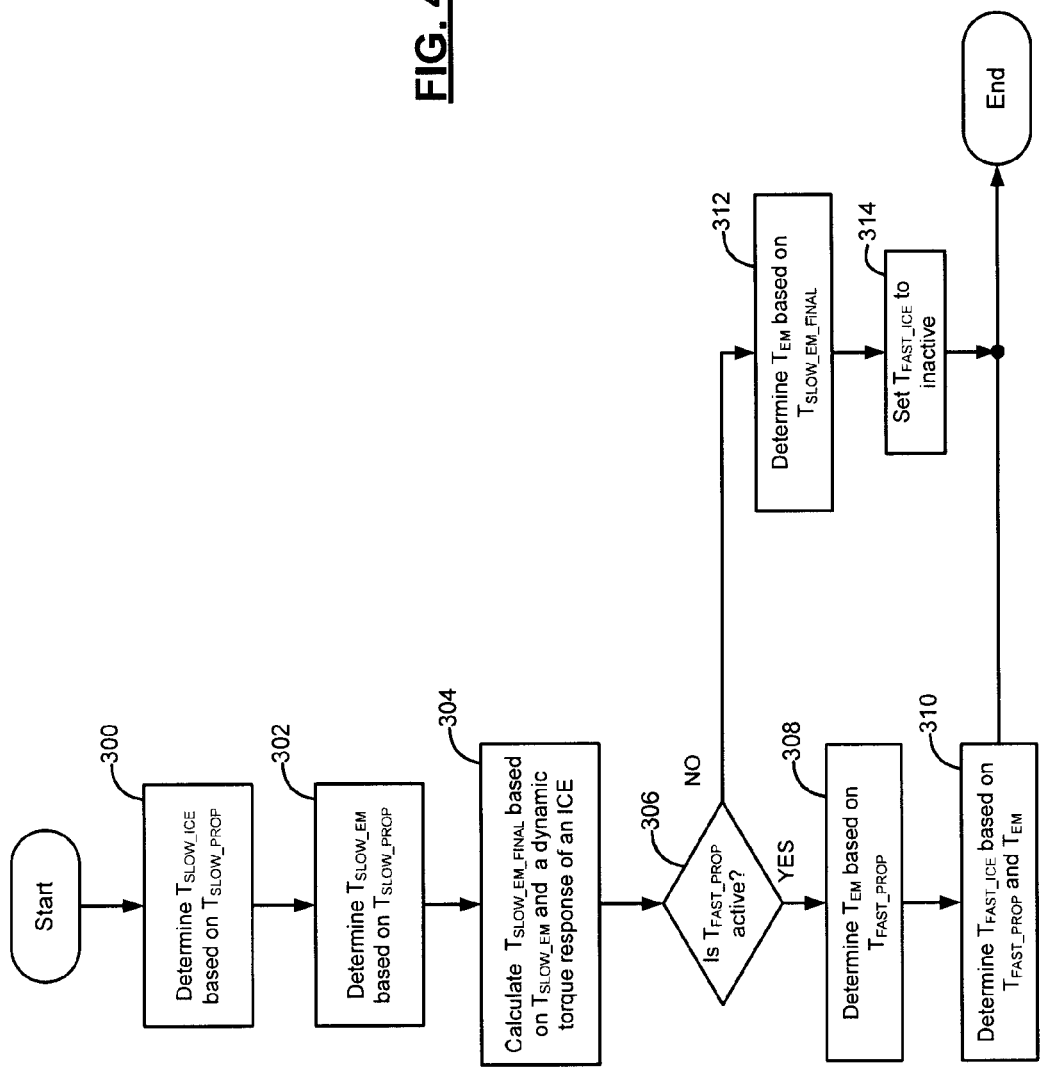
FIG. 4 is a flowchart illustrating exemplary steps executed by the torque control system according to the present disclosure.

Referring now to FIG. 4, exemplary steps executed by the torque control system according to the principle of the present disclosure will be described in detail. In steps 300 and 302, control determines $T_{SLOW\_ICE}$ and $T_{SLOW\_EM}$, respectively, based on $T_{SLOW\_PROP}$. In step 304, control calculates $T_{SLOW\_EM\_FINAL}$ based on $T_{SLOW\_EM}$ and the dynamic torque output response of the ICE 16 from FIG. 1. Control may predict the dynamic torque output response of the ICE 16 and adjust $T_{SLOW\_EM}$ to obtain $T_{SLOW\_EM\_FINAL}$ using a mathematical model such as a first order response function that incorporates a delay. In step 306, control determines whether $T_{FAST\_PROP}$ is active. When $T_{FAST\_PROP}$ is active, control determines $T_{EM}$ based on $T_{FAST\_PROP}$ in steps 308, and then determines $T_{FAST\_ICE}$ based on $T_{FAST\_PROP}$ and $T_{EM}$ in steps 310. If $T_{FAST\_PROP}$ is not active, control determines $T_{EM}$ based on $T_{SLOW\_EM\_FINAL}$ in step 312 and sets $T_{FAST\_ICE}$ to inactive in step 314.

Figure 5:
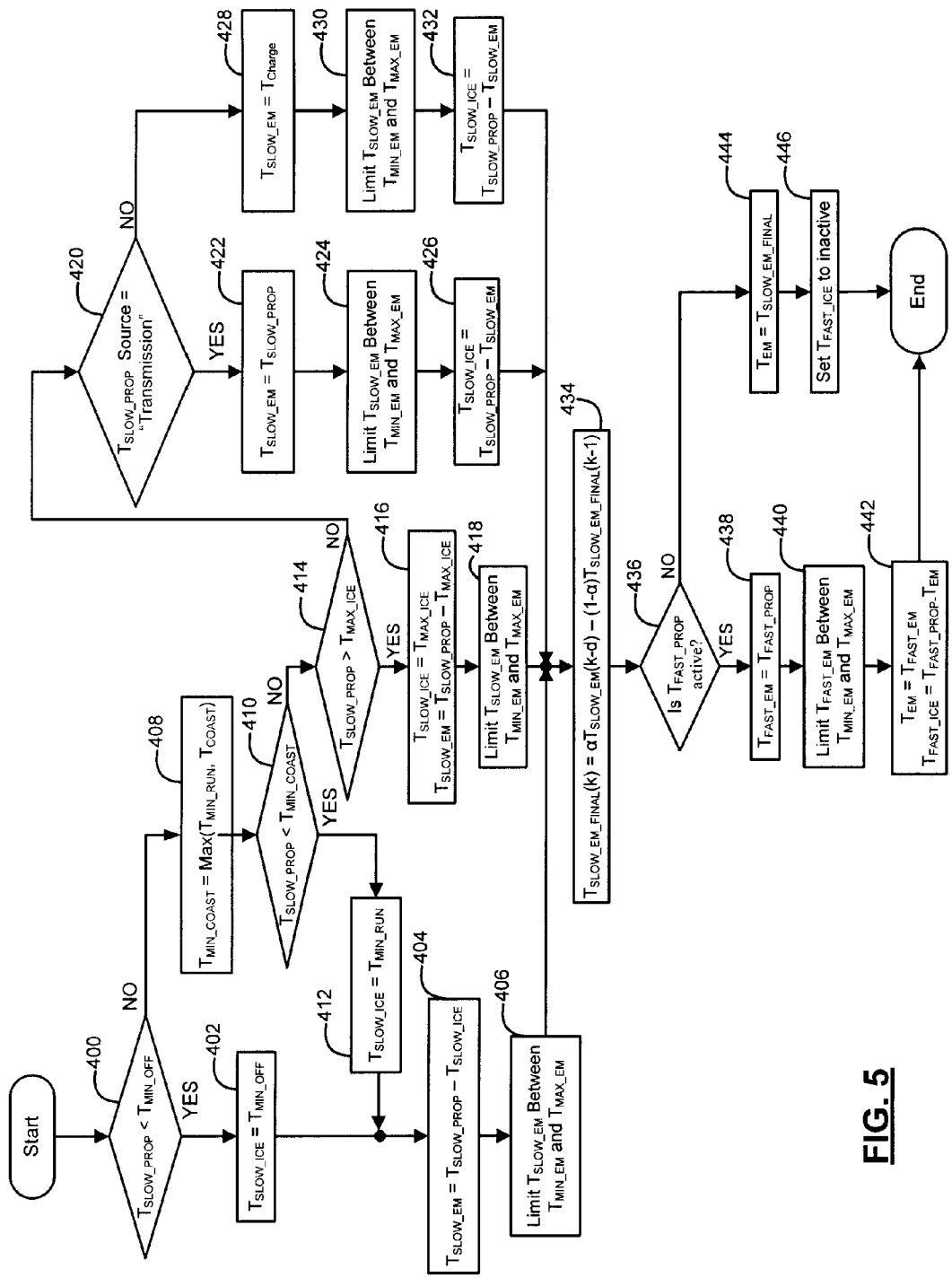
FIG. 5 is a second flowchart illustrating exemplary steps executed by the torque control system according to the present disclosure.

Referring now to FIG. 5, an alternate embodiment of exemplary steps executed by the torque control system according to the principles of the present disclosure will be described in detail. In step 400, control determines if $T_{SLOW\_PROP}$ is less than $T_{MIN\_OFF}$. When $T_{SLOW\_PROP}$ is less than $T_{MIN\_OFF}$, control sets $T_{SLOW\_ICE}$ equal to $T_{MIN\_OFF}$ in step 402, sets $T_{SLOW\_EM}$ equal to the difference between $T_{SLOW\_PROP}$ and $T_{SLOW\_ICE}$ in step 404 and limits $T_{SLOW\_EM}$ between a minimum EM torque ($T_{MIN\_EM}$) and a maximum EM torque ($T_{MAX\_EM}$) in step 406. When $T_{SLOW\_PROP}$ is not less than $T_{MIN\_OFF}$, control sets a minimum vehicle coast torque ($T_{MIN\_COAST}$) equal to the greater of $T_{MIN\_RUN}$ and $T_{COAST}$ in step 408 and determines whether $T_{SLOW\_PROP}$ is less than $T_{MIN\_COAST}$ in step 410. When $T_{SLOW\_PROP}$ is less than $T_{MIN\_COAST}$, control sets $T_{SLOW\_ICE}$ equal to $T_{MIN\_RUN}$ in step 412, sets $T_{SLOW\_EM}$ equal to the difference between $T_{SLOW\_PROP}$ and $T_{SLOW\_ICE}$ in step 404, and limits $T_{SLOW\_EM}$ between $T_{MIN\_EM}$ and $T_{MAX\_EM}$ in step 406.

When $T_{SLOW\_PROP}$ is not less than $T_{MIN\_COAST}$, control determines whether $T_{SLOW\_PROP}$ is greater than $T_{MAX\_ICE}$ in step 414. When $T_{SLOW\_PROP}$ is greater than $T_{MAX\_ICE}$, control sets $T_{SLOW\_ICE}$ equal to $T_{MAX\_ICE}$ and sets $T_{SLOW\_EM}$ equal to the difference between $T_{SLOW\_PROP}$ and $T_{MAX\_ICE}$ in step 416 and limits $T_{SLOW\_EM}$ between a $T_{MIN\_EM}$ and $T_{MAX\_EM}$ in step 418.

When $T_{SLOW\_PROP}$ is not greater than $T_{MAX\_ICE}$, control determines when the source of $T_{SLOW\_PROP}$ is the transmission 28 in step 420. When the source of $T_{SLOW\_PROP}$ is the transmission 28, control sets $T_{SLOW\_EM}$ equal to $T_{SLOW\_PROP}$ in step 422, limits $T_{SLOW\_EM}$ between $T_{MIN\_EM}$ and $T_{MAX\_EM}$ in step 424, and sets $T_{SLOW\_ICE}$ equal to the difference between $T_{SLOW\_PROP}$ and $T_{SLOW\_EM}$ in step 426. When the source of $T_{SLOW\_PROP}$ is not the transmission 28, control sets $T_{SLOW\_EM}$ equal to $T_{CHARGE}$ in step 428, limits $T_{SLOW\_EM}$ between $T_{MIN\_EM}$ and $T_{MAX\_EM}$ in step 430, and sets $T_{SLOW\_ICE}$ equal to the difference between $T_{SLOW\_PROP}$ and $T_{SLOW\_EM}$ in step 432.

In step 434, control calculates $T_{SLOW\_EM\_FINAL}$ based on $T_{SLOW\_EM}$ and the dynamic torque output response of the ICE 16. As mentioned earlier, control may predict the dynamic torque output response of the ICE 16 and adjust $T_{SLOW\_EM}$ to obtain $T_{SLOW\_EM\_FINAL}$ using a mathematical model such as a first order response function that incorporates a delay. Up to this point in the discussion of FIG. 5, control has determined all torque values for the current iteration k. In step 434, control uses torque values determined at prior iterations to match the dynamic response of the ICE 16. Thus, in step 434, control calculates $T_{SLOW\_EM\_FINAL}(k)$ by subtracting the product of the gain 1-α and $T_{SLOW\_EM\_FINAL}(k-1)$ from the product of the gain α and $T_{SLOW\_EM}(k-d)$. When $T_{SLOW\_EM\_FINAL}(k-1)$ or $T_{SLOW\_EM}(k-d)$ do not exist, control sets the value the nonexistent torque equal to 0.

In step 436, control determines whether $T_{FAST\_PROP}$ is active. When $T_{FAST\_PROP}$ is active, control sets $T_{FAST\_EM}$ equal to $T_{FAST\_PROP}$ in step 438, limits $T_{FAST\_EM}$ between $T_{MIN\_EM}$ and $T_{MAX\_EM}$ in step 440, and sets $T_{EM}$ and $T_{FAST\_ICE}$ equal to $T_{FAST\_EM}$ and the difference between $T_{FAST\_PROP}$ and $T_{EM}$, respectively, in step 442. When $T_{FAST\_PROP}$ is not active, control sets $T_{EM}$ equal to $T_{SLOW\_EM\_FINAL}$ in step 444 and sets $T_{FAST\_ICE}$ to inactive in step 446.

Figure 6:
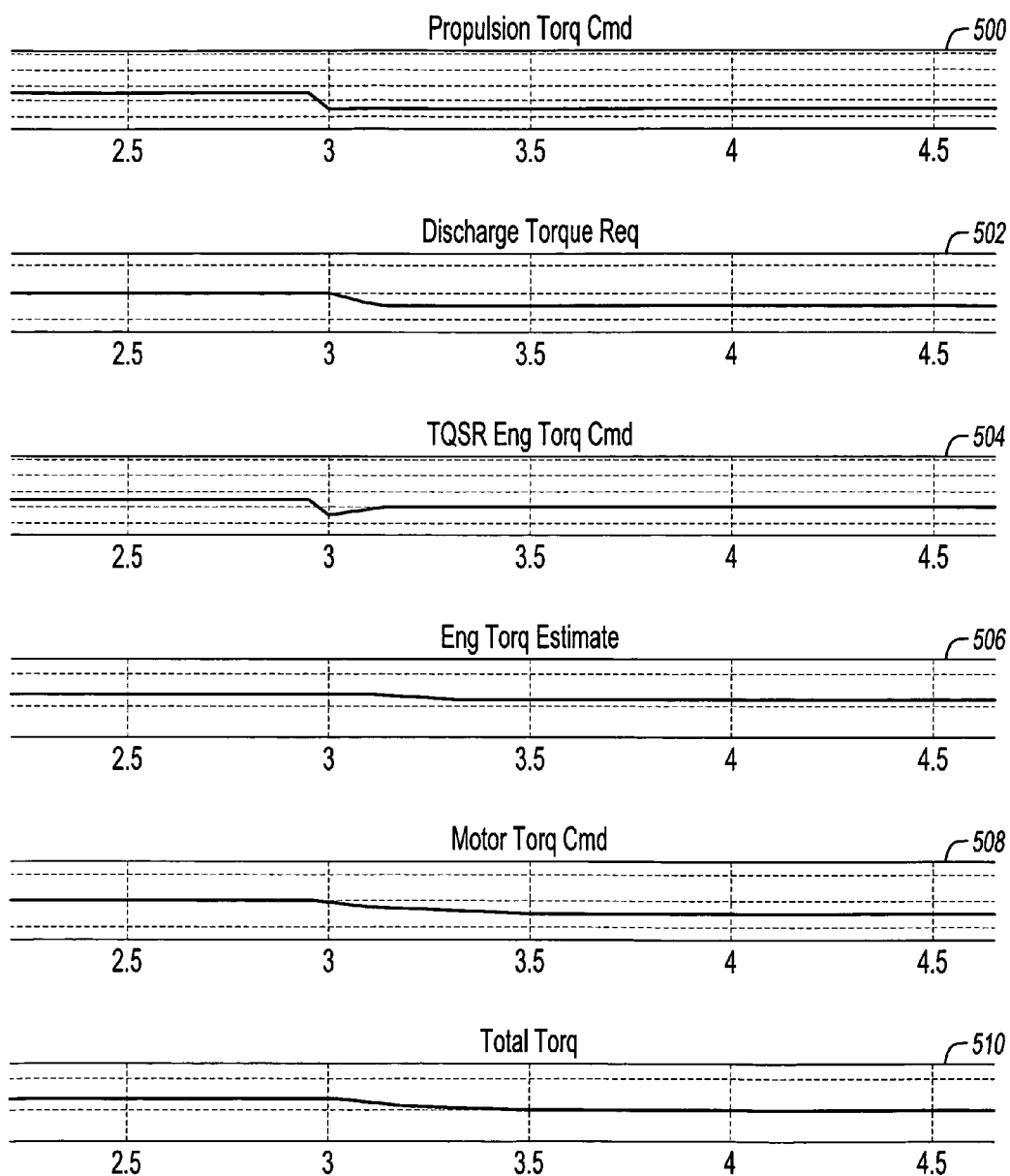
FIG. 6 illustrates various torque signals according to the present disclosure.

Referring now to FIG. 6, exemplary propulsion and charge torque requests, corresponding torque commands, and the resulting propulsion torque output will be described in detail. The vertical axes represent the magnitude of a torque signal at a time represented by the horizontal axes. Control receives the propulsion torque request and the discharge torque request shown in graphs 500 and 502, respectively, and outputs the ICE and EM torque commands shown in graphs 504 and 508, respectively. Graph 506 shows the ICE torque output resulting from the ICE torque command in graph 504, and graph 510 shows the propulsion torque output. Control decreases the ICE torque command before time 3 to track the decreasing propulsion torque request. Control also decreases the EM torque command before time 3 to compensate for the delay between the ICE torque command and the ICE torque output, and continues to decrease the EM torque command until it is equal to the charge torque request. At time 3, control increases the ICE torque command such that the propulsion torque output satisfies the propulsion torque request.

Figure 7:
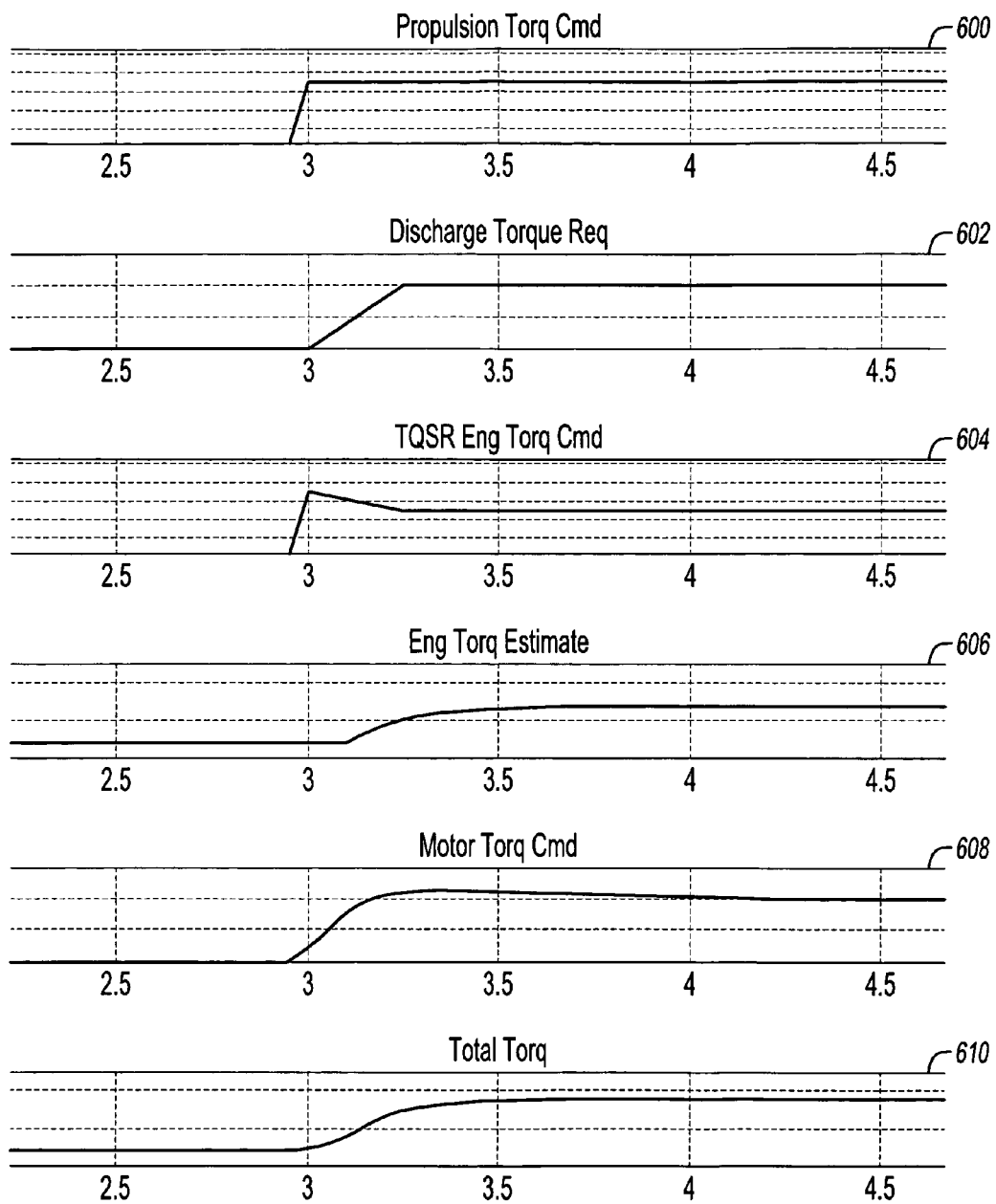
FIG. 7 illustrates various torque signals according to the present disclosure.

Referring now to FIG. 7, exemplary propulsion and discharge torque requests, corresponding torque commands, and the resulting propulsion torque output will be described in detail. As in FIG. 6, the vertical axes represent the magnitude of a torque signal at a time represented by the horizontal axes. Control receives the propulsion torque request and the charge torque request shown in graphs 600 and 602, respectively, and outputs the ICE and EM torque commands shown in graphs 604 and 608, respectively. Graph 606 shows the ICE torque output resulting from the ICE torque command in graph 604, and graph 610 shows the propulsion torque output. Control increases the ICE torque command before time 3 to track the increasing propulsion torque request. Control also increases the EM torque command before time 3 to compensate for the delay between the ICE torque command and the ICE torque output, and continues to increase the EM torque command until it is equal to the discharge torque request. At time 3, control decreases the ICE torque command such that the propulsion torque output satisfies propulsion torque request.

Figure 8:
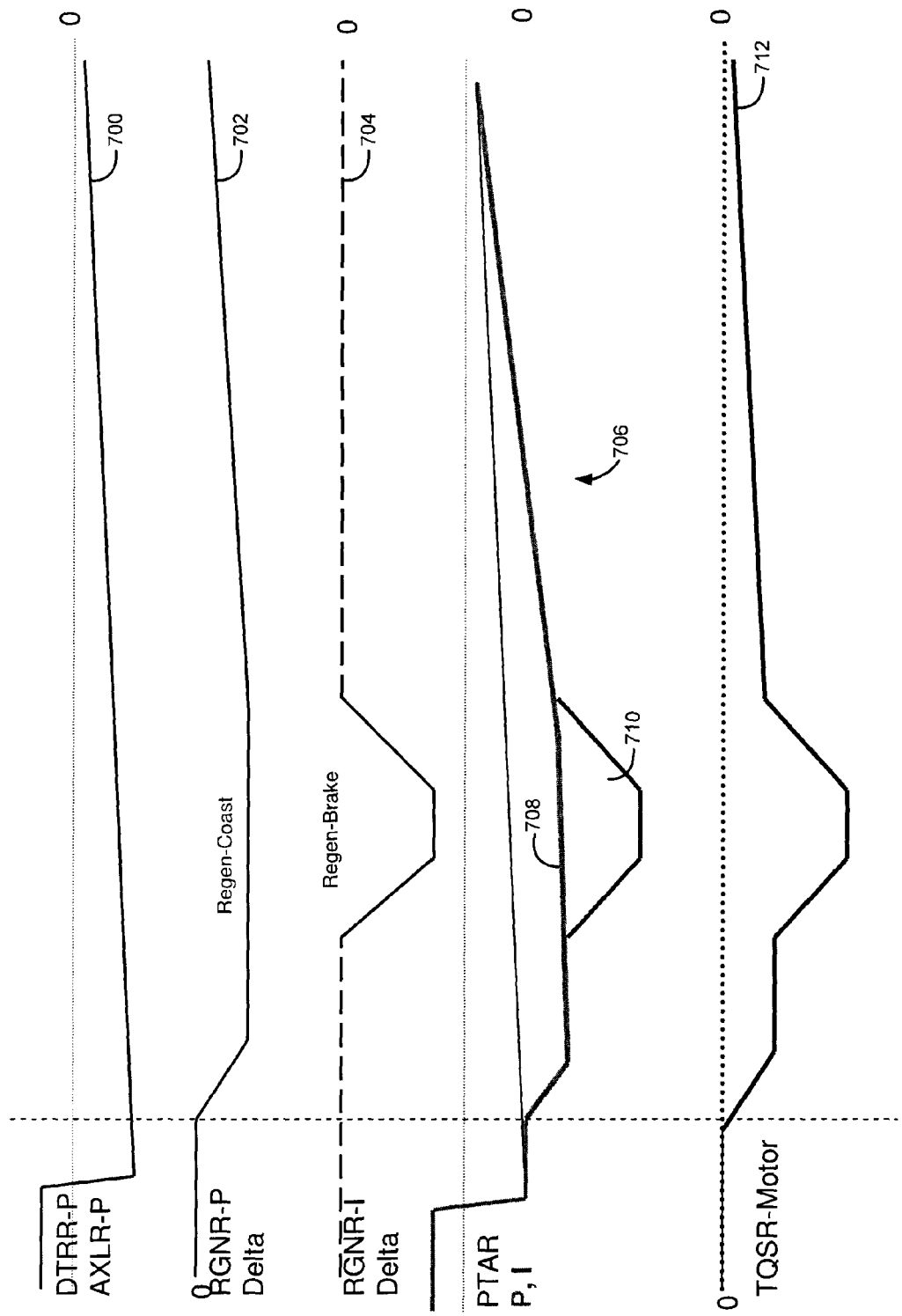
FIG. 8 is a graph illustrating exemplary predicted and immediate torque requests and corresponding torque commands determined by the torque control system according to the present disclosure.

Referring now to FIG. 8, exemplary predicted and immediate torque requests and corresponding torque commands will be described in detail. The vertical axis represents the magnitude of a torque signal at a time represented by the horizontal axis. Signal 700 represents a predicted propulsion torque request provided by the PTAR as a result of driver input. Signal 702 represents a predicted propulsion torque request provided by the PTAR as a result of coast regeneration logic. Signal 704 represents an immediate propulsion torque request provided by the PTAR as a result of brake regeneration logic. Signal 706 is an array of the predicted and immediate torque requests provided by the PTAR, which includes signals 700, 702, and 704. Signal 708 represents a sum of the predicted torque requests provided by the PTAR, and signal 710 represents a sum of the immediate torque requests provided by the PTAR. Signal 712 represents the EM torque command. Control sets the ICE torque command equal to a sum of the predicted torque requests provided by the PTAR and sets the EM torque command equal to the difference between the propulsion torque request and the ICE torque response.

What is claimed is:

1. A torque control system, comprising:
    a torque split module that, in a current iteration, determines an internal combustion engine (ICE) torque command and an electric machine (EM) torque command based on a propulsion torque request;
    an EM delay module that stores said EM torque command and that, in said current iteration, determines a delayed EM torque command based on EM torque commands determined in N previous iterations and a dynamic torque response of an internal combustion engine, wherein N is an integer greater than one; and
    a control module that controls an electric machine based on said delayed EM torque command.

2. The torque control system of claim 1, wherein said ICE torque command includes a predicted ICE torque command and an immediate ICE torque command.

3. The torque control system of claim 2, wherein said propulsion torque request includes a predicted torque request.

4. The torque control system of claim 3, further comprising a coast regeneration module that:
    compares said predicted torque request to a minimum non-fueled ICE torque request;
    determines said predicted ICE torque command based on said minimum non-fueled ICE torque request; and
    determines said EM torque command based on a difference between said predicted torque request and said predicted ICE torque command when said minimum non-fueled ICE torque request exceeds said predicted torque request.

5. The torque control system of claim 4, wherein said coast regeneration module:
    compares said predicted torque request to a maximum torque request between a minimum fueled ICE torque request and a minimum coast torque request;
    determines said predicted ICE torque command based on said minimum fueled ICE torque request; and
    determines said EM torque command based on a difference between said predicted torque request and said predicted ICE torque command when said predicted torque request exceeds said minimum non-fueled ICE torque request and is less than said maximum torque request.

6. The torque control system of claim 3, further comprising an EM boost module that:
    compares said predicted torque request to a maximum ICE torque capacity;
    determines a predicted ICE torque command based on said maximum ICE torque capacity; and
    determines said EM torque command based on an EM torque capacity and a difference between said predicted torque request and said ICE torque command when said predicted torque request exceeds said maximum ICE torque capacity.

7. The torque control system of claim 3, further comprising a predicted torque intervention module that:
    compares said predicted torque request to a maximum ICE torque capacity;

determines an EM torque command based on said predicted torque request and an EM torque capacity; and determines a predicted ICE torque command based on a difference between said predicted torque request and said EM torque command when said predicted torque request is less than said maximum ICE torque capacity.

8. The torque control system of claim 7, wherein said predicted torque request originates in a transmission.

9. The torque control system of claim 7, wherein said predicted torque request is a charge torque request.

10. The torque control system of claim 2, wherein said propulsion torque request includes an immediate torque request.

11. The torque control system of claim 10, further comprising an immediate torque intervention module that:

determines said EM torque command based on said immediate torque request and an EM torque capacity; and determines said immediate ICE torque command based on a difference between said immediate torque request and said EM torque command when said immediate torque request is active.

12. A method of regulating torque output, comprising:

determining an internal combustion engine (ICE) torque command and an electric machine (EM) torque command in a current iteration based on a propulsion torque request;

storing said EM torque command;

determining a delayed EM torque command in said current iteration based on EM torque commands determined in N previous iterations and a dynamic torque response of an internal combustion engine; and controlling an electric machine based on said delayed EM torque command, wherein N is an integer greater than one.

13. The method of claim 12, wherein said ICE torque command includes a predicted ICE torque command and an immediate ICE torque command.

14. The method of claim 13, wherein said propulsion torque request includes a predicted torque request.

15. The method of claim 14, further comprising
comparing said predicted torque request to a minimum non-fueled ICE torque;
determining said predicted ICE torque command based on said minimum non-fueled ICE torque; and
determining said EM torque command based on a difference between said predicted torque request and said predicted ICE torque command when said minimum non-fueled ICE torque exceeds said predicted torque request.

16. The method of claim 15, further comprising:
comparing said predicted torque request to a maximum torque request between a minimum fueled ICE torque request and a minimum coast torque request;
determining said predicted ICE torque command based on said minimum fueled ICE torque; and
determining said EM torque command based on a difference between said predicted torque request and said predicted ICE torque command when said predicted torque request exceeds said minimum non-fueled ICE torque and is less than said maximum torque request.

17. The method of claim 14, further comprising:
comparing said predicted torque request to a maximum ICE torque capacity;
determining a predicted ICE torque command based on said maximum ICE torque capacity; and
determining said EM torque command based on an EM torque capacity and a difference between said predicted torque request and said ICE torque command when said predicted torque request exceeds said maximum ICE torque capacity.

18. The method of claim 14, further comprising:
comparing said predicted torque request to a maximum ICE torque capacity;
determining an EM torque command based on said predicted torque request and an EM torque capacity; and
determining a predicted ICE torque command based on a difference between said predicted torque request and said EM torque command when said predicted torque request is less than said maximum ICE torque capacity.

19. The method of claim 18, wherein said predicted torque request originates in a transmission.

20. The method of claim 18, wherein said predicted torque request is a charge torque request.

21. The method of claim 13, wherein said propulsion torque request includes an immediate torque request.

22. The method of claim 21, further comprising:
determining an EM torque command based on said immediate torque request and an EM torque capacity; and
determining said immediate ICE torque command based on a difference between said immediate torque request and said EM torque command when said immediate torque request is active.

* * * * *